Oct. 19, 1926.
F. S. DUESENBERG
1,603,668
PRESSURE FLUID BRAKE SYSTEM
Original Filed Nov. 16, 1920   2 Sheets-Sheet 1
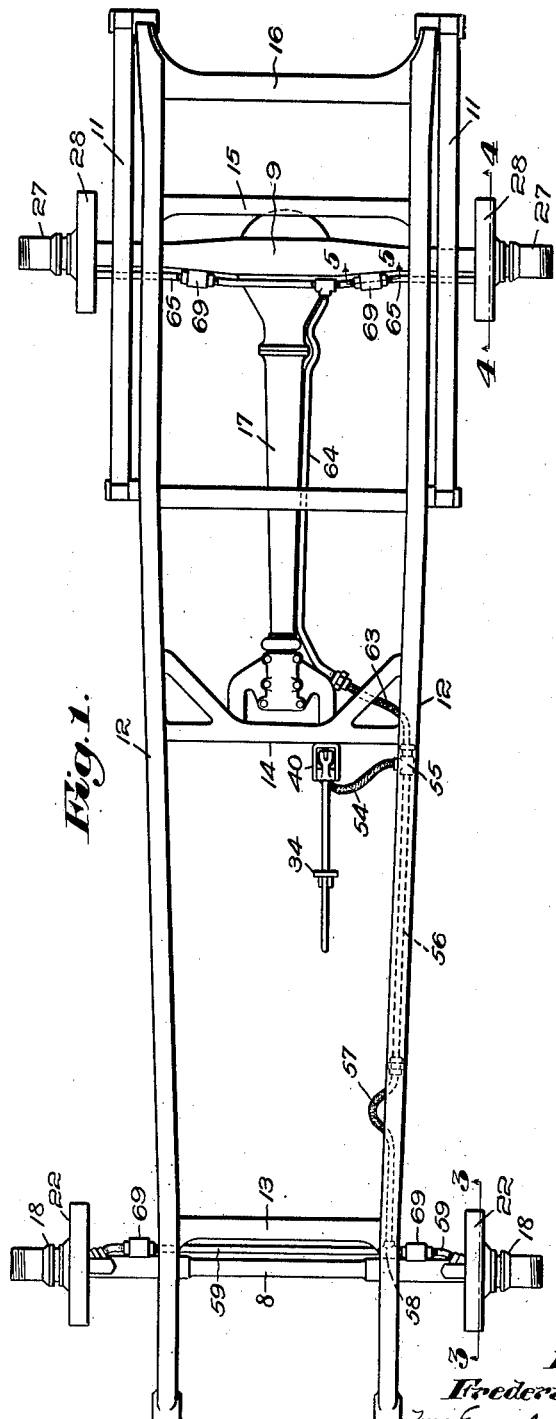
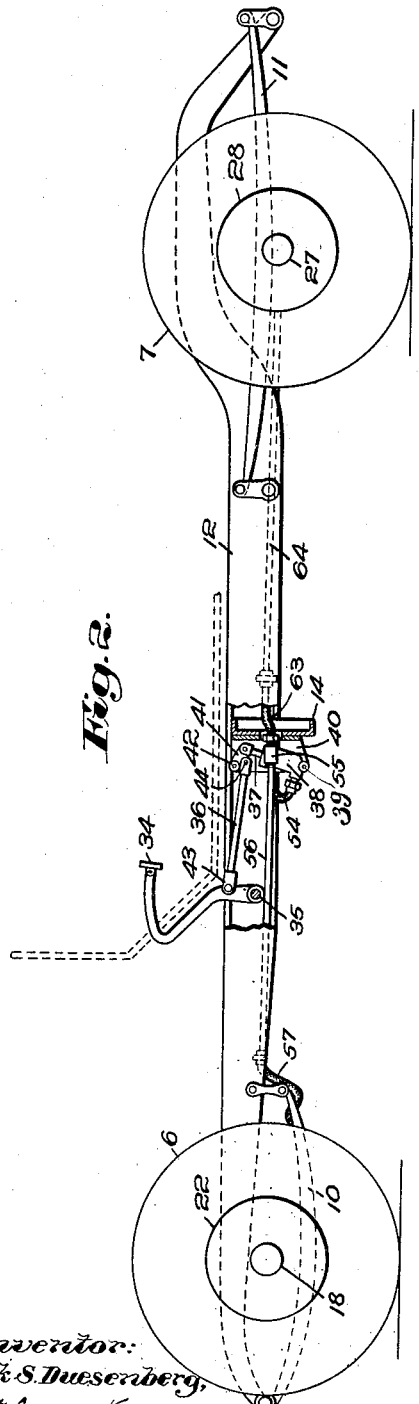
Inventor:
Frederick S. Duesenberg,
by Emery, Booth, Janney & Varney
Attys.

Oct. 19, 1926.                                                           1,603,668
                          F. S. DUESENBERG
                     PRESSURE FLUID BRAKE SYSTEM
              Original Filed Nov. 16, 1920    2 Sheets-Sheet 2
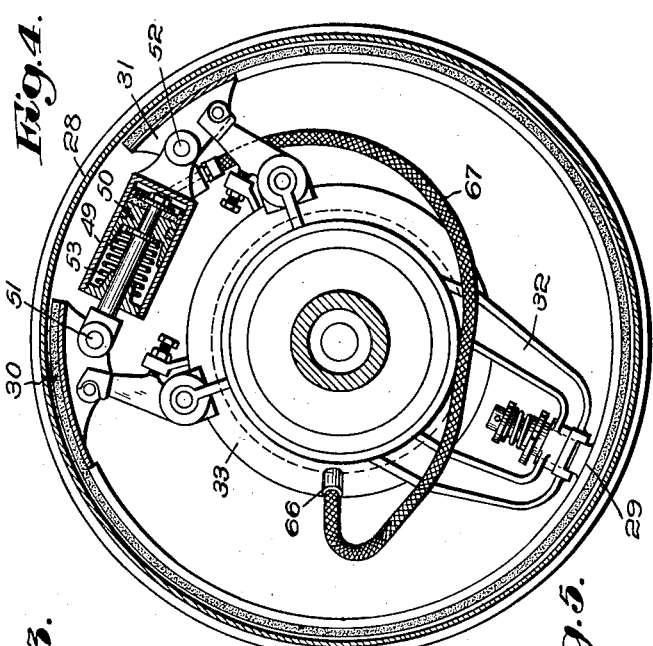
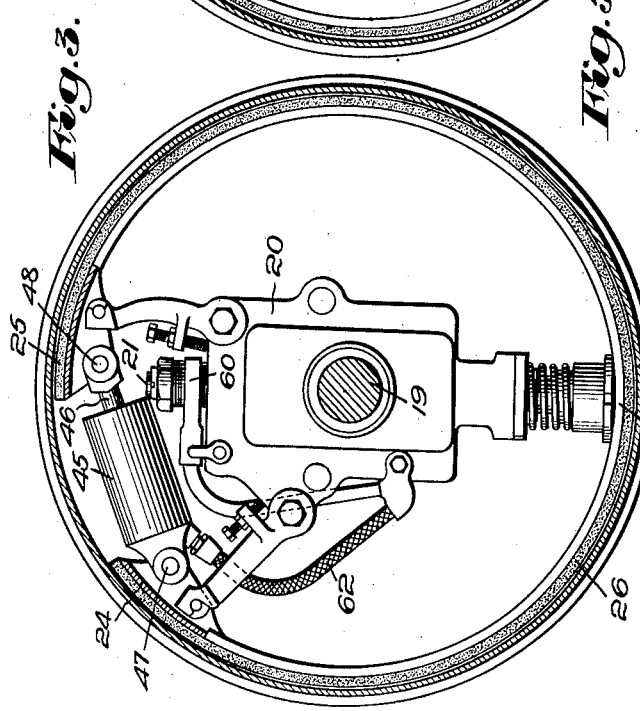
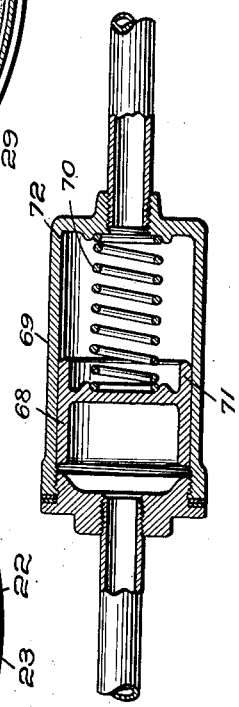
Inventor:
Frederick S. Duesenberg
by Emery, Booth, Janney & Varney
                                   Attys.

Patented Oct. 19, 1926.

1,603,668

UNITED STATES PATENT OFFICE.

FREDERICK S. DUESENBERG, OF INDIANAPOLIS, INDIANA.

PRESSURE-FLUID BRAKE SYSTEM.

Original application filed November 16, 1920, Serial No. 424,496. Divided and this application filed March 7, 1924. Serial No. 697,500.

This invention aims to provide a novel and improved fluid pressure brake system, having special utility in connection with motor vehicles.

The invention will be best understood by reference to the following description, when taken in connection with the accompanying drawings of one illustrative embodiment thereof, while its scope will be more particularly pointed out in the appended claims.

In the drawings:

Fig. 1 is a plan of a motor car chassis equipped with a brake system exemplifying the invention;

Fig. 2 is a side elevation of the same, partly in vertical section;

Fig. 3 is a detail sectional view, on an enlarged scale, on line 3—3 of Fig. 1;

Fig. 4 is a detail sectional view, on an enlarged scale, on line 4—4 of Fig. 1; and Fig. 5 is a detail sectional view, on an enlarged scale, on line 5—5 of Fig. 1.

Referring to the drawings, and to the embodiment of the invention which is selected for exemplification, there is shown in Figs. 1 and 2 a portion of the chassis of a motor vehicle, minus the motor, clutch, transmission, and part of the steering mechanism.

The chassis has front steering wheels 6 and rear driving wheels 7, conveniently represented in Fig. 2, front and rear axles 8 and 9, front and rear springs 10 and 11, and a spring-supported frame, the latter herein comprising a pair of side members 12, connected by cross-members 13, 14, 15 and 16. Herein, a torque tube 17, secured to the rear axle, is pivotally connected at its front end to the cross-member 14. All parts thus far described may be of any usual or suitable construction.

Each of the front wheels may be provided with any usual hub 18, mounted to turn on bearings on a sub axle, or spindle, 19, herein formed as a part of a steering knuckle 20 (see Fig. 3), the latter being suitably pivoted on the axle 8, as by the provision of a pivot 21. Suitably secured to each of the front wheel hubs is a brake-drum 22, and enclosed by the latter is a brake-shoe or shoes, herein exemplified by a brake-band 23, having terminals 24 and 25, which, though herein forming a part of a single band, are in effect the mechanical equivalents of distinct brake-shoes. The brake-band herein is provided with a usual brake lining 26.

Each of the rear wheels is provided with a hub 27 (see Fig. 1), to which is suitably secured a brake-drum 28, the latter enclosing one or more, herein a pair of brake-shoes, conveniently formed as parts of a brake-band 29 (see Fig. 4), having terminals 30 and 31. The lower or intermediate part of the brake-band is appropriately carried by a yoke-like support 32, suitably formed on or secured to the housing of the rear axle. Herein, the rear axle housing is provided with an annular flange 33, on which the yoke is formed. The parts of the rear brakes, as thus far described, are, or may be, of any usual or suitable construction.

The invention contemplates the use of a suitable fluid, such as oil, for the operation of all four brakes, under the control of a single actuating member conveniently located for operation by the driver. In the present example, the actuating member is a pedal 34 (see Fig. 2), fulcrumed on a pivot 35 and suitably connected, as by a link 36, with a piston 37 working in a master cylinder 38. The piston and cylinder are pivotally mounted to swing to and fro, accompanying reciprocation of the piston in the cylinder, and in the present example, the latter is mounted on a pivot 39 in a yoke-like bracket 40 appropriately secured to the cross-member 14 of the frame. The upper end of the piston is pivotally connected to a lever 41, and the latter is fulcrumed at 42 on a bracket 40. The link 36 is pivoted at 43 to the pedal 34, and at 44 to the lever 41, the arrangement being such that when the brake pedal is depressed, the master piston is caused to descend in the master cylinder and expel fluid therefrom, restoration of the pedal and the connected parts to their initial position being effected by any usual or desired spring, not shown herein.

The master cylinder controls two sets of brake cylinders, one set for the front wheels and another for the rear wheels. Referring now to Fig. 3, each of the front wheel brakes is provided with a brake cylinder 45 having a piston 46 working therein, one pivotally connected at 47 to the brake terminal 24, and the other pivotally connected at 48 to the brake terminal 25. Similarly, each of the rear wheel brakes (see Fig. 4) is provided with a brake cylinder 49, and a piston 50 working therein, one pivotally connected at 51 to the brake-band terminal 30, and the other pivoted at 52 to the other brake-band terminal 31. The brakes are applied by the introduction of oil or other suitable fluid into the brake cylinders, thereby causing the pistons and cylinders to be forced in opposite directions. The brakes are retracted by suitable springs, such as the spring 53.

The connections between the master cylinder and the brake cylinders will now be described, reference being had at first to Figs. 1 and 2. Leading from the bottom of the master cylinder is a conduit 54, herein flexible to permit free swinging movement of the master cylinder. This conduit is connected on the one hand to the front wheel brakes, and on the other hand to the rear wheel brakes. Referring first to the front wheel brakes, the conduit is herein extended laterally to a T fitting 55, supported on one of the side frame members 12, and said fitting communicates with a conduit 56, extending in a forward direction along the frame. This conduit may be rigid, as no movement is required of it. At its forward end, this conduit is connected to a flexible conduit 57, having its forward end carried by the front axle, and suitably arranged to permit the axle and frame to move up and down, one with relation to the other. One convenient way of accomplishing this is to carry the flexible conduit along the top of one of the front springs 10, and to provide a sufficient slack of the conduit adjacent the rear end of the spring, as represented in Fig. 2.

The front end of the conduit 57 is connected by a T fitting 58 with two branch conduits 59 extending longitudinally of the front axle. These conduits are connected to and communicate with the steering pivots 21, which are hollow, and the pivots in turn communicate through swivels 60 (see Fig. 3) with the brake cylinders 45, as by means of rigid conduits 61 and flexible conduits 62, the latter being adapted to bend to permit movement of the brake cylinders.

The connections leading from the master cylinder to the rear wheel brake cylinders will now be described, reference being had at first to Figs. 1 and 2. Owing to the fact that there is relative vertical movement between the frame and the rear axle, it is evident that these connections must be in part at least flexible, and to this end, I have provided a flexible conduit 63 leading from the T fitting 55, and connected to a rigid conduit 64, which is carried by the torque tube 17. It will be remembered that the latter is pivoted at its forward end to the frame, and is rigidly attached at its rear end to the rear axle; hence it moves up and down with the latter. Leading from the conduit 64 are two branches 65, each suitably connected to its brake cylinder, as by an elbow 66 and a flexible conduit 67, leading from the latter to the brake.

The general operation of the brake system as thus far described should be evident from the foregoing, without further description, except to say that the brakes are applied by depressing the pedal, which causes the master piston to descend and expel fluid from the master cylinder through the described connections to the brake cylinders. When pressure is removed from the brake pedal, the parts are restored to their initial positions by the action of the springs acting on the pistons of the several cylinders. It should now be evident that the fluid system ensures equalization of action of all four brakes, thus minimizing the danger of skidding when the brakes are applied.

In the event of any serious leakage from one of the brake cylinders, due to any cause such as the bursting of the flexible connection leading thereto, provision is made for automatically limiting the fluid loss to that particular brake, thus preventing the entire brake system from going out of commission. One convenient way of accomplishing this is by the use of suitable pressure-responsive means interposed in the branches 59 and 65, between the brake cylinders and the connections leading to the master cylinder. In the present example, I have shown for this purpose pressure-responsive means comprising a piston 68 (see Fig. 5) working in a cylinder 69 having its ends connected to two parts of such branch. A light spring 70 constantly tends to urge the piston toward the master cylinder. During the normal operation of the system, the piston moves idly to and fro, and simply transmits the fluctuations of pressure from one side to the other side thereof, thus causing the brakes to be operated just as if the pistons were not present. While the piston might be made a close working fit in the cylinder, this would necessitate a separate filling of the connections outwardly beyond the piston, and I prefer to make the piston a comparatively loose working fit in the cylinder, so that there will be an interchange of fluid past the piston during the normal operation. When, however, there is any great drop of pressure outwardly beyond the piston 68, the latter may be caused to shut off that particular branch, as by the use of a valve 71, suitably carried by the piston, and cooperating with a seat 72 at the outer end of the cylinder. When, therefore, there is a tendency toward an abnormal difference of pressure on opposite sides, respectively, of the piston, — that is to say, when the pressure on the outer side is very much less than that on the inner side, the light spring yields, and the piston carries the valve against its seat, thereby completely closing the branch and preventing any loss of oil, except that which is outwardly beyond the valve. This being so, the remaining brakes will continue to operate as before.

This application is a division of my pending application, Ser. No. 424,496, filed November 16th, 1920.

Having thus described one embodiment of my invention, but without limiting myself thereto, what I claim and desire by Letters Patent to secure is:

1. In a brake system, the combination of a plurality of brakes, each having fluid pressure responsive actuating means, master fluid pressure actuating means, and connections between said master actuating means and the individual brake actuating means, said connections including pressure-responsive means to transmit normal fluctuations of pressure from one side to the other side thereof and having provision to limit fluid loss to that part of said connections which is intermediate said pressure-responsive means and the individual brake actuating means actuated thereby.

2. In a brake system, the combination of a plurality of brakes, each having fluid pressure-responsive actuating means, master fluid pressure actuating means, and connections between said master actuating means and the individual brake actuating means, said connections including pressure-responsive means to transmit normal fluctuations of pressure from one side to the other side thereof, and a valve closed by said pressure-responsive means upon the occurrence of an abnormal difference of pressure on opposite sides, respectively, of said pressure-responsive means.

3. A vehicle brake mechanism comprising a plurality of brakes, a plurality of fluid operating means one for each of said brakes, a single means for operating the fluid operating means, and means for automatically cutting off fluid connection to any or all of said operating means in the event of an abnormal drop of pressure within such operating means.

4. An automatic safety check device employing a non-compressible fluid element, which includes a source of fluid supply, a brake mechanism, a pipe leading from one to the other, and an automatic cutoff which instantly stops the flow of the fluid element upon a break occurring in the pipe at a point beyond the cutoff.

5. A vehicle brake mechanism comprising a plurality of rotatable members, each having a frictional bearing surface, a non-rotatable frictional member for the frictional bearing surface of each rotatable member, a main cylinder having a main piston therein, a fluid in the cylinder chamber, intermediate cylinders, one for each rotatable member all connected to the main cylinder, an intermediate piston in each intermediate cylinder, a fluid operated piston for causing contact between the respective sets of frictional members and connections between the intermediate cylinders and the fluid operated pistons, respectively.

In testimony whereof, I have signed my name to this specification.

FREDERICK S. DUESENBERG.